Sept. 11, 1928.  1,683,867
A. W. COPLAND ET AL
METHOD OF TRUING GEARS
Original Filed April 10, 1922  6 Sheets-Sheet 1

Sept. 11, 1928.

A. W. COPLAND ET AL

METHOD OF TRUING GEARS 1,683,867

Original Filed April 10, 1922   6 Sheets-Sheet 3

INVENTORS
A. W. Copland and
M. J. Mathewson
BY
Ray A. Gehr ATTORNEY

Sept. 11, 1928.

A. W. COPLAND ET AL

1,683,867

METHOD OF TRUING GEARS

Original Filed April 10, 1922    6 Sheets-Sheet 5

Sept. 11, 1928.

A. W. COPLAND ET AL

1,683,867

METHOD OF TRUING GEARS

Original Filed April 10, 1922    6 Sheets-Sheet 6

INVENTORS
A. W. Copland
M. J. Mathewson
BY
ATTORNEY

Patented Sept. 11, 1928.

1,683,867

UNITED STATES PATENT OFFICE.

ALEXANDER W. COPLAND, OF BIRMINGHAM, MICHIGAN, AND MAXWELL I. MATHEWSON, OF PROVIDENCE, RHODE ISLAND, ASSIGNORS TO DETROIT TRUST COMPANY, OF DETROIT, MICHIGAN, A CORPORATION OF MICHIGAN.

METHOD OF TRUING GEARS. REISSUED

Continuation of application Serial No. 551,141, filed April 10, 1922, and in Great Britain September 14, 1926. This application filed February 4, 1927. Serial No. 165,867.

The invention relates to a method of truing toothed gears, or other bodies having circular series of radiating surfaces, by a grinding or lapping process. Examples of such bodies other than gears are splined shafts, index plates, etc. Since, however, the truing of toothed gears presents all aspects of the invention, the latter will be particularly described with reference thereto. The present application constitutes a continuation of our earlier application Serial No. 551,141, filed April 10, 1922.

The objects of the invention comprise the correction of defects, first, with respect to the spacing and alignment of the teeth, second, with respect to the concentricity of the true pitch circle and the axis of rotation of the gear, third, with respect to variations or irregularities in the different teeth, and fourth, with respect to the true tooth form.

A further object of the invention is to accomplish the foregoing results by a simple process susceptible of being carried out by means of simple apparatus.

The improved method is based upon the principle that the amount of material removed from a surface being ground is proportional first, to the area of the abrading surface traversing a unit area of the surface to be ground, second, the pressure of the abrading surface upon a unit area of the surface to be ground, and third, the character of the abrading surface. According to this principle, to produce uniform grinding on all portions of a surface contacting with the abrading surface, there must be uniformity in pressure and area. This is not the case in the ordinary prior processes of lapping gears by rolling the same with intermeshing gears, whether the gears are merely revolved or are revolved and also axially reciprocated relative to each other.

According to the present invention there is substituted for the intermeshing spur gear of the prior methods a lap in the form of an internal gear with teeth complementary to those of the gear to be trued and having its circular pitch and the diameter of its pitch circle approximately the same as those of the gear to be trued so as to fit over the latter in telescoping relation. With the gear and lap coaxially arranged, they are given a relative reciprocatory movement to effect engagement of their teeth and as the gear and lap start into mutual engagement a torque pressure of the one upon the other is set up and maintained uniform per unit area of engagement as the relative reciprocation of the gear and lap proceeds. The relative reciprocatory movement of the gear and lap is intermittently interrupted to permit the gear to be angularly advanced (indexed) in relation to the lap so that different teeth of the gear and lap are brought successively into engagement. In addition the gear and lap are so supported that limited relative movement of the one in relation to the other in any direction radial to their axes is permitted with the result that the torsional pressure referred to causes an automatic centering of the gear in relation to the lap. Suitable abrasive is applied to the mutually engaging surfaces of the lap and gear.

The lapping effected by carrying out these steps is uniform on all surfaces which are simultaneously in contact. Furthermore, because of the indexing of the gear in relation to the lap irregularties either in individual tooth form or in the spacing of the teeth are corrected, the effect of continued lapping with the progressive change in registration being to continually approach equispacing of the teeth and uniform tooth contour.

While the new method may be carried out with various forms of apparatus, for the sake of specific illustration and explanation, reference is had to the accompanying drawings showing by way of example a form of apparatus which has been found satisfactory.

Our method may be carried out with various forms of apparatus, but a suitable apparatus is shown in the accompanying drawings, in which Fig. 1 is a vertical central section through the machine.

Fig. 1ª is a fragmentary vertical section showing a modified form of lap carrier and cooperating parts.

Fig. 2 is a front elevation, partly in section, of the machine shown in Fig. 1.

As shown in the drawings the apparatus comprises, first, means for relatively reciprocating the gear to be ground and its corresponding lapping member, second, means for intermittently progressively changing the registration of the teeth of the gear and lap, and third, means for varying the mutual torque pressure of the gear and lap teeth.

Figures 1, 1A:
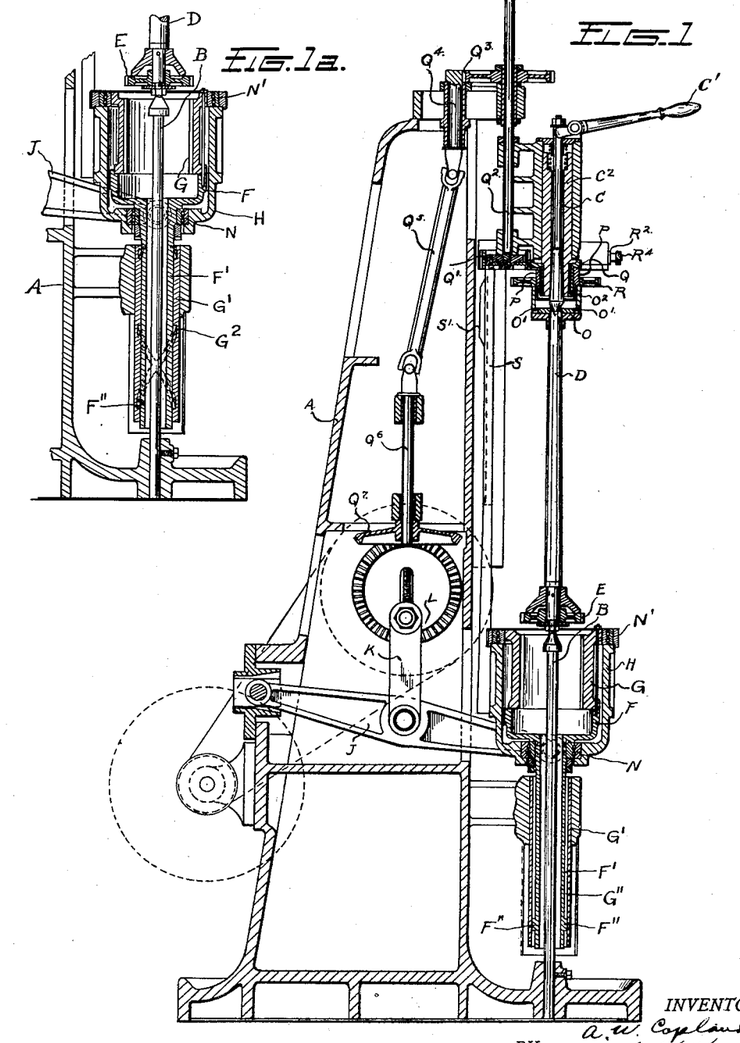
Figure 2:
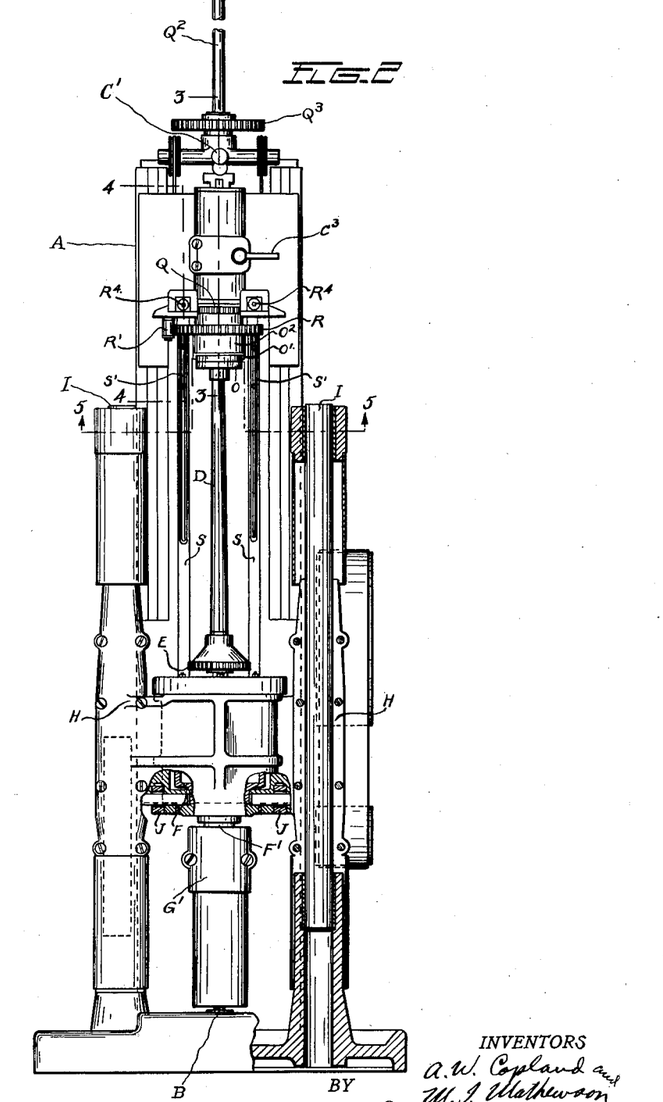
Figure 3:
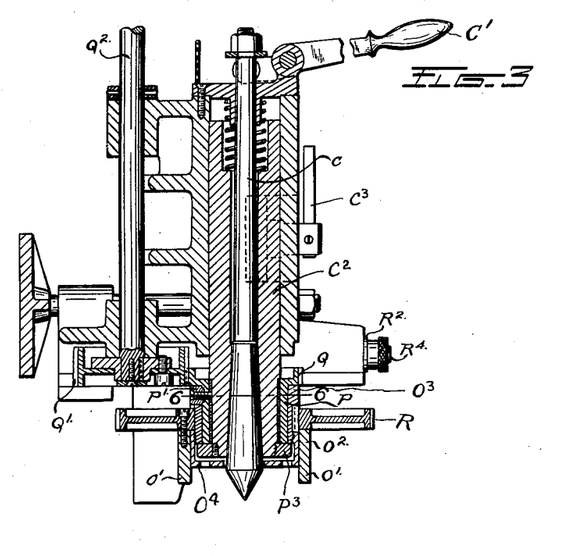
Fig. 3 is an enlarged longitudinal section through the indexing head on line 3—3 of Fig. 2.

Referring in detail to the construction illustrated, A is a suitable frame on which are mounted the center spindles B and C for carrying an arbor D having the gear E to be ground. F is an annular member carrying the lap G. This lap, of suitable material such as cast iron, is in the form of an internal gear having the diameter of its pitch circle and its circular pitch approximately the same as those of the spur gear to be ground so as to fit over the latter with the internal teeth of the lap simultaneously engaging the teeth of the spur gear. The lap-carrying member F is arranged concentric to the axis of the spindles B and C and mounted by means of an antifriction bearing N upon a crosshead H which slides upon ways I on the machine frame. The upper end of the lap is additionally supported by an antifriction bearing N' between the lap and the crosshead H. The member F is formed with a depending tubular shank F' which slidably engages a fixed bearing G' carried by the machine frame. The shank F' carries splines F'' which engage straight longitudinal grooves G'' in the fixed bearing G'. J is a lever for reciprocating the crosshead H and member F actuated by link K connected to a crank L, said crank being adjustable in throw to vary the length of the reciprocation. Obviously the reciprocation of the crosshead H effects a corresponding reciprocation of the lap G and the spline and groove connection F'' G'' holds the lap against rotational movement. Thus during each revolution of the crank the lap G will be moved longitudinally a distance equal to its length plus somewhat more than the width of the gear to be ground, thereby passing into and out of engagement with the gear at opposite ends of each stroke. As the fixed spindle B is long and slender and supported only at its lower end it is permitted to flex slightly and thus its upper end forms a support for the gear and arbor adapted to move laterally somewhat in any direction relative to the lap and its support.

To change the registration of the gear and the lap on successive strokes, an intermittently operating indexing mechanism is provided. This comprises a dog O on the arbor D, which is engaged by pins or lugs O' on a rotatable member $O^2$ secured, as by screws, to ratchet wheel R which in turn is keyed to a sleeve $O^3$. The keyed connection between the ratchet R and the sleeve $O^3$ is made secure by the spanner nut $O^4$ which is threaded on the sleeve $O^3$. The latter member is mounted with a lost motion connection on the extended hub P of the gear Q, the lost motion connection being formed by the lug P' on the hub P engaging a slotted bearing in the member $O^3$ (see Fig. 6). A light coil spring $P^2$ in the slotted bearing serves to hold the lug normally in driving contact with the member $O^3$. A nut $P^3$ on the end of sleeve $C^2$ engages hub P and sleeve $O^3$ to hold them rotatably on sleeve $C^2$. The gear Q is connected by a gear train with the drive mechanism for the crank L, said train including a Geneva stop movement, or equivalent device, for converting the continuous rotary motion of the drive into intermittent rotation of the member D. This, in detail, comprises a gear wheel Q' on a shaft $Q^2$ connected by the Geneva stop movement $Q^3$ with a shaft $Q^4$, which latter is connected by a flexible shaft $Q^5$ with the shaft $Q^6$ driven by bevel gear wheel $Q^7$ from the crank shaft. The arrangement is such that twice during each revolution of the crank shaft, rotary motion is transmitted to the member O sufficient to advance the teeth of the gear wheel being ground into registration with other interdental spaces of the lap. This movement is effected during the portions of the cycle of the crank where the gear wheel is out of engagement with the lap, so that in successive reciprocations or strokes of the crank the gear wheel has different angular engagements with the lap.

As has been stated, the pressure of the lap against the gear wheel per unit area is one factor determining the grinding action. Where the lap is moved into and out of engagement with the gear wheel it is evident that during initial engagement the area of contact is small and is progressively increased until the whole of the gear is in contact with the lap. Therefore, if the torque pressure on the arbor D were to remain uniform, there would be a greater grinding action at the ends of the stroke where the contact area is limited than at the center of the stroke where the full area is in engagement. Such a result is avoided by varying the torque pressure during engagement and disengagement and with the construction shown this is accomplished by transmitting the torque through a spring and suitably varying the tension of the spring, the specific devices employed being as follows:

The ratchet wheel R which is exchangeably mounted on member $O^3$ and carries the member $O^2$, is engaged by a pawl R' carried by a slide $R^2$ mounted in the frame. This slide is yieldably actuated by a spring $R^3$, which in turn is actuated by a rod $R^4$. S is a member mounted on the crosshead H which is provided with a cam portion S' for engaging the rod $R^4$ and actuating the same to place a tension on the spring $R^3$. The parts are so constructed and arranged that when the gear wheel is out of engagement with the lap, no pressure will be exerted by the cam on the rod $R^4$, and consequently the spring $R^3$ will be at zero tension. On the other hand, when the gear wheel enters engagement with the lap, the cam S' also engages the rod $R^4$ progressively moving the latter and thereby increasing the tension of the spring $R^3$. The movement imparted to the rod $R^4$ is completed as the gear becomes fully engaged with the lap so that intermediate the point of initial engagement and the point of full engagement the tension of the spring $R^3$ has been increased from zero to a predetermined maximum amount. The tension then remains constant during the further relative reciprocating movement of the lap in relation to the gear until at the opposite end of its stroke it again passes out of engagement, at which time the cam S' gradually relieves the tension of the spring to correspond to the diminishing area of contact. This variation in tension is permitted by the lost-motion connection between the member $O^3$ and the member P formed by the lug P' engaging the slotted bearing. Thus the pressure of the lap against the gear wheel will be maintained substantially constant per unit area of surface engagement. It is to be observed in this connection that if the pressure is to be kept constant, as last referred to, the speed of the machine should not be too great else the application of the pressure by the cam V through the spring U, especially in the case of narrow gears, will be too sudden and not controlled in accordance with the shape of the cam.

Figure 4:
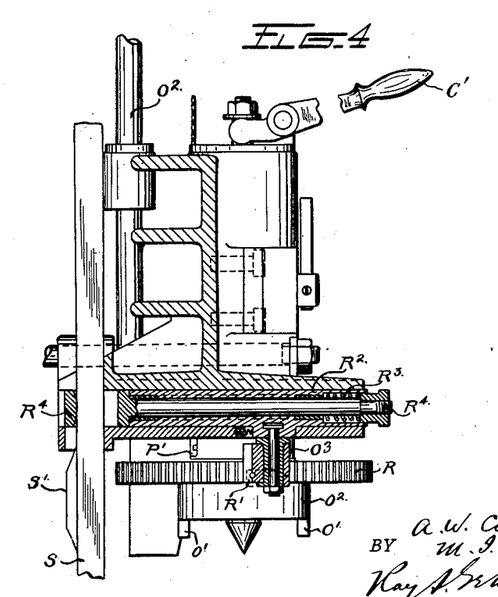
Fig. 4 is a section through said head in the plane of the variable torque connection on line 4—4 of Fig. 2.
Figures 5, 6:
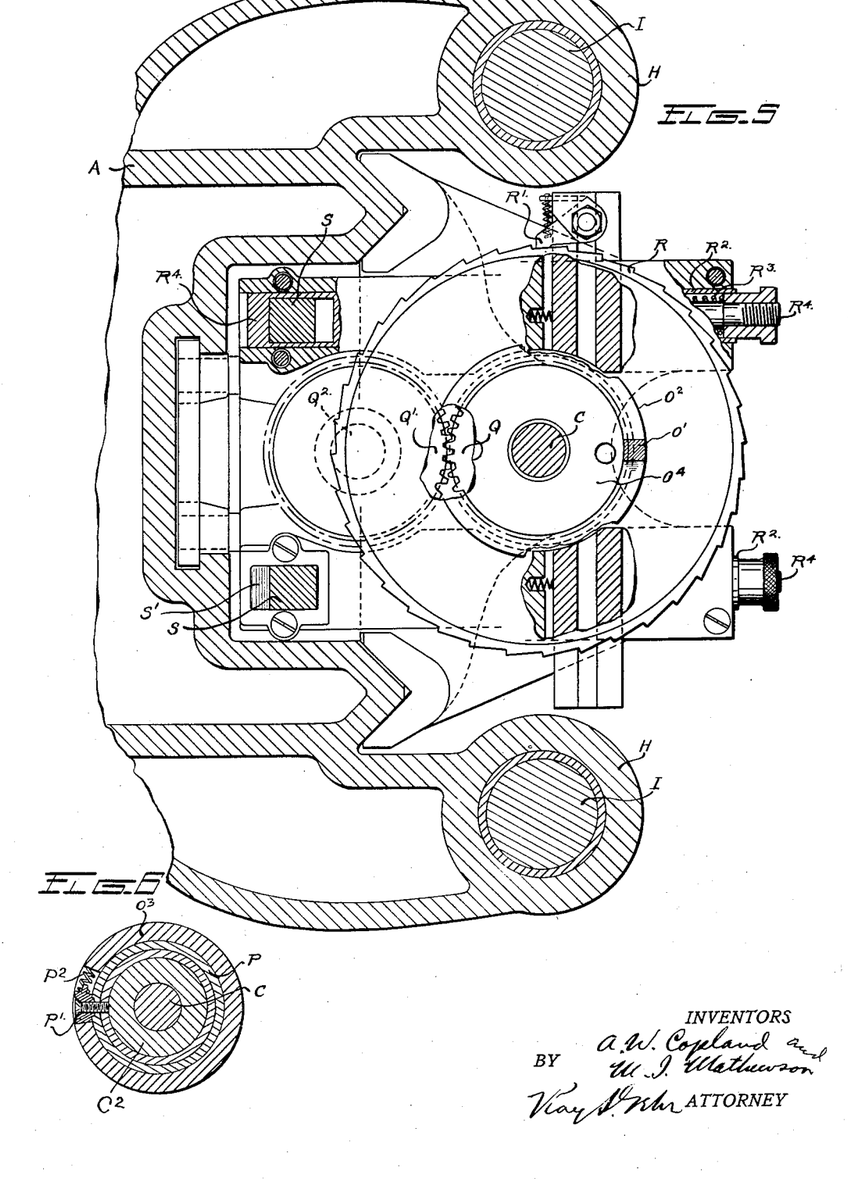
Fig. 5 is a horizontal section substantially on line 5—5 of Fig. 2.
Fig. 6 is a horizontal section on line 6—6 of Fig. 3.

It will be noted on reference to Figs. 2, 4 and 5 that a duplicate set of pawl carrying and actuating parts $R^2$, $R^3$ and $R^4$ are provided at the diametrically opposite side of ratchet wheel R and that a second cam S' is provided to actuate them. Thus by changing the pawl R' from one carrier $R^2$ to the other and turning over the ratchet wheel R, it is possible to lap both sides of the teeth of a gear without turning the latter over.

To facilitate engagement and disengagement of the work the center bearing C, together with the sleeve $C^2$, can be raised and lowered by the lever C', having first released the clamp $C^3$. This permits of withdrawing the center whenever the work arbor D is to be disengaged for the removal of finished work and the engagement of new work to be ground.

In carrying out the improved method of the present invention by the apparatus just described, or any other suitable means, one proceeds as follows: The gear wheel, or other object to be ground, is mounted either singly or in series on the arbor D and the latter is engaged with the center spindles B and C. A corresponding lap G is attached to the annular member F and arranged in registration with the gear wheel. The surface of the lap is then coated with abrasive material, after which motion is imparted to the machine to cause a reciprocation of the lap relative to the gear. At the same time the torque pressure on the gear is varied as above described, so that during contact with the latter there will be a uniform pressure per unit of contact area. After each reciprocation or stroke the indexing mechanism advances the gear into a different position of registration so that the contacting surfaces are changed after each stroke. The lapping thus effected is continued until the desired truing of the gear is effected.

Assuming that in the gear to be ground one or more of the teeth are distorted so as to come into contact with the lap in advance of the others, these advanced surfaces will first be ground away as will also the contacting portions of the lap. However, by reason of the progressive change in registration, the wearing away of the lap is uniformly distributed over a number or all of the teeth thereof, whereas the grinding upon the gear continues on the high spots until these are reduced to the level of the other portions. Assuming again that the lap is inaccurate, having certain portions of its surface in advance of the true form, these advanced portions will therefore first come in contact with the gear teeth and will be progressively ground away. There will also be a grinding action upon the gear teeth, but due to the progressive change in registration, this grinding is not all on any one tooth but is distributed over a plurality of teeth. Therefore, not only the gear but also the lap will constantly approach the true form as the grinding proceeds. In other words, the effect of continued grinding is to average the contour and circular pitch of all of the teeth in both the gear and the lap and if this average is the true form, the gear will be rendered true. Since the supporting spindle B is capable of moving laterally somewhat at its upper end, the gear has in a measure a floating support. Hence when mutual torsional pressure is exerted between three or more circumferentially spaced teeth of the lap and a corresponding number of the gear teeth, the gear moves laterally in a manner tending to center itself relative to the lap or, in other words, in a manner tending to bring the pitch circles of the gear and lap into coincidence. This centering action continues as long as the mutual torsional pressure is exerted and the result is that all the teeth of the gear are lapped to approximately their true contour with respect to a common gear axis and corresponding pitch circle with the removal of a minimum amount of material from the tooth surfaces.

Figure 7:
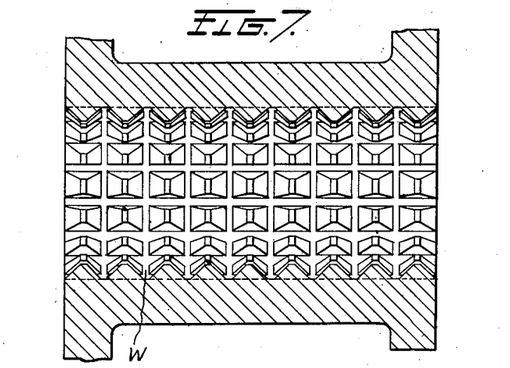
Fig. 7 is a longitudinal section through a construction of annular lap for modifying the tooth contour.
Figure 8:
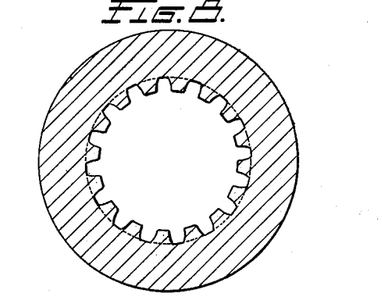
Fig. 8 is a cross section thereof.
Figure 9:
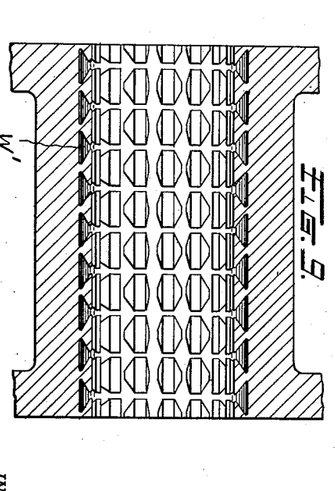
Fig. 9 is a view similar to Fig. 7 of another lap construction for producing a different modification of the tooth contour.
Figures 10, 11, 12:
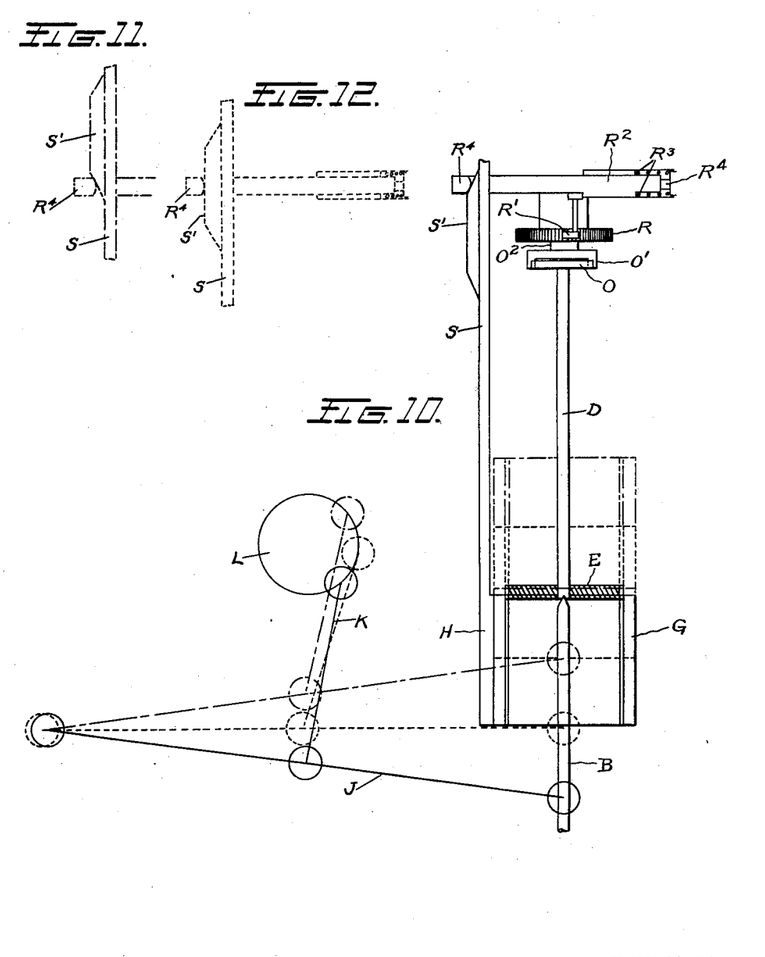
Fig. 10 is a diagram illustrating the operation of the machine in the carrying out of the method.
Figs. 11 and 12 are also diagrams showing the manner of altering the torque pressure.

In case the average tooth form secured by the above procedure is not the true or desired form, due either to the original cutting or to any other cause, the process as thus far described is incapable of producing the true form. We may, however, by a modification of the method correct an inaccurate average form by employing a modified lap construction. This modified method forms the subject matter of our application for patent, Serial No. 551,140, filed April 10, 1922. In brief it consists in differentially interrupting the surface of the lap so as to produce a greater grinding effect on one portion of the gear tooth than on another. For instance, if the crown portion of the gear tooth projects beyond the true involute curve desired, this portion may be ground to a greater extent than the root portion by cutting notches W in the teeth of the lap, as shown in Fig. 7. Thus the amount of surface in the lap which rubs over the root of the gear tooth is less than the amount of surface rubbing over the crown portion of said tooth which results in removing more material from the crown portion and more closely approximating the true involute curve. The reverse effect may be produced by using a lap such as shown in Fig. 9, with teeth cut away more at the root than at the crown, as indicated at W′, the effect of this being to grind more at the root of the gear tooth than at the crown thereof.

The invention is also applicable to the grinding of helical gears, the modification of the apparatus shown in Fig. 1ª being applicable for this purpose. Here the fixed bearing G′ has helical grooves G² instead of the straight grooves G″ of the first construction. The construction is therefore such that during the reciprocation of the holder F the lap will be turned by the mutual engagement of the splines F″ and the helical grooves G², through the same angle as is defined by the helical teeth of the gear. In other respects the operation of the apparatus is as previously described.

While in the construction illustrated the lap is given a reciprocating or combined reciprocating and turning movement and the torsional pressure is applied through the gear, it is obvious that the result will be the same whether these respective relative movements and torsional pressure of the lap and gear are effected entirely through one or the other of said members or in part through one of them and in part through the other.

While the improved method has been described as applied to the grinding of gears, as has previously been pointed out, it is applicable to the grinding of other bodies having radiating surfaces arranged in uniform circular series. By "uniform circular series" we mean one in which the radiating surfaces are so spaced that the circumferential or circular pitch distance between any two of said surfaces is either equal to or a multiple of the circular pitch distance between adjacent radiating surfaces.

Also, it is obvious that our process is equally applicable to the grinding of both internal and external gears or other bodies. Thus if the gear or body to be ground has its teeth, or parts with radiating surfaces, on an external perimeter, the lap will have its complementary, oppositely toothed or surfaced parts on an internal perimeter thereof; and, vice versa, if the gear or other body to be ground has internal teeth or radiating surfaces, the lap will have external teeth or radiating surfaces. In all cases the pitch circles of the gear and lap will be approximately equal in diameter, and in all cases the teeth of the lap, or its parts with radiating surfaces, will have contours parallel to the tooth contours of the gear or body to be lapped. We employ the expressions "oppositely toothed", "oppositely disposed teeth" and "oppositely surfaced" to indicate the complementary internal-external arrangement of the teeth or radiating surfaces of the gear and lap, respectively, or of the lap and gear, respectively, as the case may be. While it is preferable on account of greater ease of manufacture to make the lap teeth fully complementary to the teeth of the gear or the like to be trued, it will be understood that the only complementary relation between the lap and gear teeth which is necessary is that between the active lapping surfaces, and, since only one side of a tooth can be active at one time, it would be possible to lap a gear by our method with a lap having teeth with the complementary formation on one side only, it being only necessary after lapping one side of the gear teeth to turn the gear over in order to lap the other sides of its teeth. Also, the term "pitch circle" when applied to toothed gears, is to be understood in its usual technical sense applicable to such gears, whereas when applied to other bodies having radiating surfaces in circular series it is to be understood as the circle defined by the mean radius of the radiating surfaces.

In our method the effect of continued use of a lap is to true the same in the same way that the gear is trued, and consequently initial inaccuracies in the lap are in a measure corrected by use thereof. This aspect of our invention is of greater importance where equi-spacing of the teeth of the gear is the thing chiefly sought, since equi-spacing of the lap teeth is very thoroughly effected by continued use of the lap. If a particular form of gear tooth is to be strictly adhered to we prefer to correspondingly form the lap teeth as accurately as may be initially. Also, it is to be observed that while the use of modified or corrective laps renders high accuracy in the original cutting of the gear unnecessary since the desired modification of the gear tooth can be effected by the lap, it is obviously desirable if possible to cut the gears with sufficient accuracy so that the use of the modified lap is not required.

While the foregoing detailed description sets forth the preferred procedure it will be understood that the procedure described can be varied without departing from the invention as defined in the appended claims.

What we claim is:

1. The method of grinding gears comprising registering the gear to be ground and a lap having a parallel tooth contour, axially reciprocating the one with respect to the other into and out of mutual engagement, maintaining substantially throughout the mutual overlapping relation of the two substantially uniform torque pressure per unit area of mutual engagement, and progressively changing the registration between the teeth of the lap and those of the gear.

2. The method of grinding gears which comprises registering the gear to be ground and a lap having a parallel tooth contour, axially reciprocating one with respect to the other, progressively rotatively advancing one with respect to the other while out of engagement to change the registration of the teeth, maintaining between the gear and lap substantially uniform torque pressure during said reciprocation while said gear and lap are in full contact, and varying the torque pressure while the said gear and lap are entering upon and passing out of full contact to maintain substantially equal pressure per unit area of contact.

3. The method of grinding gears which comprises registering the gear to be ground and a lap, the two being in the relation of axially coincident internal and external intermeshing gears, axially reciprocating the one with respect to the other into and out of mutual engagement, progressively rotatively advancing one with relation to the other while they are out of mutual engagement to change the registration of the teeth, and maintaining throughout the mutually overlapping relation of the two a torque pressure of the one on the other which is substantially constant per unit area of mutual engagement.

4. The method of grinding gears which comprises registering the gear to be ground and a lap, said parts being in the relation of axially coincident intermeshing internal and external gears, axially reciprocating one with respect to the other, rotatively advancing one in relation to the other after each reciprocation to change the registration of the teeth, maintaining a substantially uniform torque pressure of the one against the other while said parts are in full engagement, and varying the torque pressure at the entering upon and passing out of full engagement to maintain substantially uniform pressure per unit area of engagement.

5. The method of grinding a body, such for example as a toothed gear, having at its perimeter radiating surfaces arranged in a uniform circular series, said method comprising registering the body with a complementary oppositely surfaced lap having its radiating surfaces parallel in contour to those of said body and disposed in a pitch circle of approximately the same diameter as that of said body; axially reciprocating one in telescoping relation to the other; maintaining a torsional pressure of one upon the other during said reciprocation; and progressively changing the registration of the body and lap by intermittently angularly advancing one in relation to the other while they are out of mutual engagement.

6. The method of grinding a body, such for example as a toothed gear, having at its perimeter radiating surfaces arranged in a uniform circular series, said method comprising coaxially registering the body with a lap having a plurality of radiating surfaces oppositely disposed and of parallel contour to the radiating surfaces of the body, the said lap having its radiating surfaces spaced around a pitch circle of approximately the same diameter as the pitch circle of the said body and at distances from each other which are equal to or multiples of the circular pitch of the radiating surfaces of said body; axially reciprocating one of said parts in telescoping relation to the other; maintaining a torsional pressure of one upon the other during their reciprocational engagement; and progressively changing the registration of the body and lap by intermittently angularly advancing one in relation to the other while they are out of mutual engagement.

7. The method of grinding toothed gears which comprises coaxially registering the gear to be ground with a lap having oppositely disposed teeth of parallel contour and approximately the same circular pitch as the gear; axially reciprocating one in telescoping relation to the other; maintaining a torsional pressure of one upon the other during said reciprocation; and progressively changing the registration of the gear and lap by intermittently angularly advancing one in relation to the other while they are out of mutual engagement.

8. The method of grinding gears which comprises registering a gear to be ground and a lap in the relation of axially coincident internal and external intermeshing gears, in axially reciprocating the one with respect to the other in mutual abrasive contact, and in intermittently progressively rotatively advancing the one in relation to the other to change the registration of the teeth.

9. The method of accurately equi-spacing a circular series of surface portions of like contour of a body, such for example as a toothed gear, which comprises coaxially registering the same with a lap having a circular series of complementary oppositely surfaced portions, axially reciprocating the one with respect to the other in mutual abrasive contact, and progressively angularly changing the registration of the body and lap.

10. The method of accurately equi-spacing a circular series of radiating surfaces of a body, such for example as a toothed gear, which consists in coaxially registering the same with a lap having a plurality of surfaces oppositely disposed and of parallel contour to said surfaces of the body, the said surfaces of the lap being spaced around a pitch circle of approximately the same diameter as the pitch circle of the body and at distances from each other which are equal to or multiples of the circular pitch of the body; axially reciprocating the one with respect to the other in mutual abrasive contact; and progressively angularly changing the registration of the body and lap.

11. The method of grinding a body, such for example as a toothed gear, having at its perimeter radiating surfaces arranged in a uniform circular series, said method comprising coaxially registering the body with a complementary oppositely surfaced lap having its radiating surfaces parallel in contour to those of said body and disposed in a pitch circle of approximately the same diameter as that of said body; creating a mutual torsional pressure between the radiating surfaces of the body and lap and thereby moving their pitch circles into coincidence; axially reciprocating one in telescoping relation to the other while maintaining said torsional pressure; and progressively changing the registration of the body and lap by intermittently angularly advancing one in relation to the other while they are out of mutual engagement.

12. The method of grinding a body, such for example as a toothed gear, having at its perimeter radiating surfaces arranged in a uniform circular series, said method comprising coaxially registering the body with a lap having a plurality of radiating surfaces oppositely disposed and of parallel contour to the said surfaces of the body, the radiating surfaces of the lap being spaced around a pitch circle of approximately the same diameter as the pitch circle of the body and at distances from each other which are equal to or multiples of the circular pitch of the body; creating a mutual torsional pressure between the radiating surfaces of the body and the lap and thereby moving their pitch circles into coincidence; axially reciprocating one in telescoping relation to the other while maintaining said torsional pressure; and progressively changing the registration of the body and lap by intermittently angularly advancing one in relation to the other while they are out of mutual engagement.

13. The method of grinding helical toothed gears which comprises coaxially registering the gear to be ground with a lap having oppositely disposed teeth of parallel contour and approximately the same circular pitch as the gear; causing a combined axial and rotational movement of the one member relative to the other; maintaining a torsional pressure of one upon the other during said relative movement; and progressively changing the registration of the gear and lap by intermittently angularly advancing one in relation to the other while they are out of mutual engagement.

14. The method of grinding helical toothed gears which comprises coaxially registering the gear to be ground with a lap having oppositely disposed teeth of parallel contour and approximately the same circular pitch as the gear; causing a combined axial and rotational movement of the one member relative to the other, which movement is positively determined independently of said other member; maintaining a torsional pressure of one upon the other during said relative movement; and progressively changing the registration of the gear and lap by intermittently angularly advancing one in relation to the other while they are out of mutual engagement.

15. A method of finishing gear wheels according to which an internal gear wheel is disposed completely to encircle an external gear wheel, the teeth of said gear wheels being equal in number and complementary in shape, and said gear wheels by relative axial reciprocating motion are then subjected to a series of mutual grinding actions with intermediate circumferential adjustments to engage successively different teeth of said gear wheels, as set forth.

16. A method of finishing gear wheels according to which an internal gear wheel is disposed completely to encircle an external gear wheel, the teeth of said gear wheels being equal in number and complementary in shape, torque is applied to bring corresponding tooth faces of said gear wheels into operative contact, and said gear wheels by relative axial reciprocating motion are then subjected to a series of mutual grinding actions with intermediate circumferential adjustments to engage successively different teeth of said gear wheels, as set forth.

In testimony whereof, we hereunto affix our signatures.

ALEXANDER W. COPLAND.
MAXWELL I. MATHEWSON.